US009677410B2

(12) United States Patent
Shinohara et al.

(10) Patent No.: US 9,677,410 B2
(45) Date of Patent: Jun. 13, 2017

(54) SHAFT SEALING DEVICE, AND ROTARY MACHINE EQUIPPED THEREWITH

(75) Inventors: Tanehiro Shinohara, Tokyo (JP); Hidekazu Uehara, Tokyo (JP); Shin Nishimoto, Tokyo (JP); Takashi Nakano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 705 days.

(21) Appl. No.: 13/994,877

(22) PCT Filed: Dec. 20, 2011

(86) PCT No.: PCT/JP2011/079545
§ 371 (c)(1),
(2), (4) Date: Jun. 17, 2013

(87) PCT Pub. No.: WO2012/090793
PCT Pub. Date: Jul. 5, 2012

(65) Prior Publication Data
US 2013/0259680 A1    Oct. 3, 2013

(30) Foreign Application Priority Data
Dec. 27, 2010   (JP) .................................. 2010-290144

(51) Int. Cl.
*F01D 11/00*        (2006.01)
*F16J 15/3292*      (2016.01)

(52) U.S. Cl.
CPC ............ *F01D 11/00* (2013.01); *F01D 11/001* (2013.01); *F16J 15/3292* (2013.01); *F05D 2240/59* (2013.01)

(58) Field of Classification Search
CPC .... F01D 11/00; F01D 11/001; F05D 2240/57; F05D 2240/59; F16J 15/3292; F16J 15/3284; F16J 15/3288
See application file for complete search history.

(56) References Cited

U.S. PATENT DOCUMENTS 5,031,922 A    7/1991   Heydrich
5,042,823 A    8/1991   Mackay et al.
(Continued)

FOREIGN PATENT DOCUMENTS

CN    1573023       2/2005
EP    0 933 567     8/1999
(Continued)

OTHER PUBLICATIONS

International Search Report issued Mar. 13, 2012 in International (PCT) Application No. PCT/JP2011/079545.
(Continued)

*Primary Examiner* — Craig Kim
*Assistant Examiner* — Jason Davis
(74) *Attorney, Agent, or Firm* — Wenderoth, Lind & Ponack, L.L.P.

(57) ABSTRACT

A shaft sealing device and a rotary machine equipped therewith are provided with a sealing body configured by stacking a plurality of thin sealing pieces; and a low-pressure-side side sealing plate in which a plate surface facing the low-pressure side is pressed against an inner wall surface of the housing facing the direction of the axis by means of the pressure of a fluid applied from a high-pressure side to the low-pressure side. A protrusion for blocking a downward flow toward the inside of the low-pressure-side side sealing plate in the radial direction along the low-pressure side of the sealing body is formed on the inside of the low-pressure-side side sealing plate in the radial direction, and a communication path for guiding the downward flow blocked by means of the protrusion to a low-pressure-side region is formed on the housing.

12 Claims, 11 Drawing Sheets

(56) References Cited

U.S. PATENT DOCUMENTS

| | | | |
|---|---|---|---|
| 5,054,823 A | 10/1991 | Arnoldt | |
| 5,135,237 A | 8/1992 | Flower | |
| 5,568,931 A | 10/1996 | Tseng et al. | |
| 5,884,918 A | 3/1999 | Basu et al. | |
| 6,196,550 B1 | 3/2001 | Arora et al. | |
| 6,267,381 B1 | 7/2001 | Wright | |
| 6,293,554 B1 | 9/2001 | Dinc et al. | |
| 6,457,719 B1 | 10/2002 | Fellenstein et al. | |
| 7,413,194 B2* | 8/2008 | Wright | F16J 15/3288 277/355 |
| 7,434,813 B1 | 10/2008 | Franceschini et al. | |
| 7,976,026 B2* | 7/2011 | Verma | F01D 11/00 277/355 |
| 8,439,364 B2* | 5/2013 | Bowsher | F16J 15/3292 277/355 |
| 2001/0004145 A1 | 6/2001 | Wright et al. | |
| 2002/0063391 A1* | 5/2002 | Kono | F16J 15/3288 277/355 |
| 2007/0102886 A1* | 5/2007 | Uehara | F01D 11/00 277/355 |

FOREIGN PATENT DOCUMENTS

| | | |
|---|---|---|
| EP | 1 013 975 | 6/2000 |
| EP | 1 653 129 | 5/2006 |
| EP | 1 892 381 | 2/2008 |
| FR | 2 650 048 | 1/1991 |
| GB | 2 286 434 | 8/1995 |
| JP | 10-196801 | 7/1998 |
| JP | 2002-71027 | 3/2002 |
| JP | 2005-3199 | 1/2005 |
| JP | 3616016 | 2/2005 |
| JP | 2007-132432 | 5/2007 |
| JP | 3970298 | 9/2007 |
| JP | 2010-522297 | 7/2010 |

OTHER PUBLICATIONS

Written Opinion of the International Searching Authority issued Mar. 13, 2012 in International (PCT) Application No. PCT/JP2011/079545, with English translation.
Office Action issued Apr. 15, 2003 in U.S. Appl. No. 09/983,881.
European Search Report issued Jun. 3, 2004 in European Application No. 01125628.6.
Notice of Reasons for Rejection issued Jun. 8, 2004 in Japanese Application No. 2001-032132, with English translation.
Notice of Allowance issued Aug. 22, 2005 in U.S. Appl. No. 09/983,881.
Chinese Office Action issued Aug. 22, 2014 in corresponding Chinese Patent Application No. 201180062610.9 with English translation.

* cited by examiner

SHAFT SEALING DEVICE, AND ROTARY MACHINE EQUIPPED THEREWITH

TECHNICAL FIELD

The present invention relates to a shaft sealing device that seals an annular space between a rotor and a stator to divide the annular space into a low-pressure-side region and a high-pressure-side region, and a rotary machine equipped therewith.

Priority is claimed on Japanese Patent Application No. 2010-290144, filed Dec. 27, 2010, the content of which is incorporated herein by reference.

BACKGROUND ART

A shaft sealing device is provided around a rotor in rotary machines, such as a gas turbine and a steam turbine, in order to reduce the leakage amount of a working fluid that flows from a high-pressure side to a low-pressure side. As an example of the shaft sealing device, the shaft sealing device described in the following Patent Document 1 is known.

The shaft sealing device includes a housing provided in a stator, and a sealing body constituted by multiple thin sealing pieces.

In the sealing body, the multiple thin sealing pieces are stacked with small clearances therebetween so that the thickness direction of each thin sealing piece is directed to the circumferential direction of the rotor. The respective thin sealing pieces are obliquely arranged so that the end portions (tips) thereof on a radially inward side are located further toward the front side in the rotational direction of the rotor than the end portions (rear ends) of the thin sealing pieces on a radially outward side, to be coupled to each other at the rear ends thereof, and the tips of the thin sealing pieces are free ends.

In the shaft sealing device configured in this way, the tip of each thin sealing piece comes into contact with the rotor when the rotor remains stationary. If the rotor rotates, the tip of the thin sealing piece is lifted from the outer periphery of the rotor by a dynamic pressure effect produced by the rotation of the rotor, and comes out of contact with the rotor. For this reason, in the shaft sealing device, wear of each thin sealing piece is suppressed, and the service life of a seal is extended.

Moreover, the shaft sealing device is provided with a low-pressure-side side sealing plate that covers the low-pressure side of the sealing body in the circumferential direction, and a high-pressure-side side sealing plate that covers a high-pressure side of the sealing body in the circumferential direction. By adjusting the radial dimensions of the low-pressure-side side sealing plate and the high-pressure-side side sealing plate, the sizes of a space on the high-pressure side of the thin sealing piece and a space on the low-pressure side thereof are specified and the gas pressure distribution of a small clearance is set so as to assist a lifting force generated by the above-described dynamic-pressure effect.

PRIOR ART DOCUMENT

Patent Document

Patent Document 1: Japanese Patent No. 3616016

SUMMARY OF INVENTION

Problem to be Solved by the Invention

Incidentally, in the above-described shaft sealing device, a clearance of an unexpected size between the tip of the thin sealing piece and the outer peripheral surface of the rotor may be formed due to the eccentricity of the rotor accompanied with thermal deformation of the rotor and the stator and reduction in precompression to the rotor from the thin sealing piece. In this case, there is a case where fluttering occurs at the tip of the thin sealing piece due to a downward flow that flows along the low-pressure side of the thin sealing piece.

That is, on the low-pressure side of the thin sealing piece, a flow (downward flow) of a fluid that is directed to the radially inward side of the rotor is generated due to a pressure distribution caused by the low-pressure-side side sealing plate and the high-pressure-side side sealing plate described above. In this case, if a clearance is formed between the tip of the thin sealing piece and the outer peripheral surface of the rotor, a disturbance may occur due to a flow in the clearance portion and a flow caused by the downward flow, and fluttering may occur near the tip of the thin sealing piece.

The present invention has been made in consideration of such circumstances, and an object thereof is to provide a shaft sealing device that can suppress fluttering of a thin sealing piece to improve durability, and a rotary machine equipped with the shaft sealing device.

Means for Solving the Problem

According to a first aspect of the present invention, a shaft sealing device is provided in an annular space between a rotor and a stator surrounding an outer peripheral side of the rotor to divide the annular space into a low-pressure-side region and a high-pressure-side region in the direction of an axis of the rotor. The shaft sealing device includes a housing fixed to the stator; a sealing body configured by stacking a plurality of thin sealing pieces extending toward a radially inward side of the rotor from the housing in a circumferential direction of the rotor; and a plate-shaped body that is arranged along a low-pressure side of the sealing body and in which a surface facing the low-pressure side is pressed against an inner wall surface of the housing facing the direction of the axis by means of the pressure of a fluid applied from a high-pressure side to the low-pressure side. A stemming portion that blocks a flow of the fluid that is directed to the radially inward side along the low-pressure side of the sealing body is formed on the radially inward side of the plate-shaped body. The housing is formed with a communication path that guides the flow of the fluid blocked by the stemming portion to the low-pressure-side region.

According to such a shaft sealing device, a flow that is directed to the radially inward side of the rotor along the low-pressure side of the sealing body, that is, a downward flow is blocked by the stemming portion located on the radially inward side of the plate-shaped body. Then, the flow of a fluid based on the downward flow blocked in this way is guided to the low-pressure-side region via the communication path formed in the housing. It is thereby possible to avoid the downward flow from reaching the end portion of the thin sealing piece on the radially inward side of the rotor, that is, the tip of the thin sealing piece.

Accordingly, even in a case where an unexpected clearance is formed between the tip of the thin sealing piece and the rotor, disturbance of a flow caused by the downward flow can be prevented from occurring at the tip of the thin sealing piece.

Additionally, in the shaft sealing device according to a second aspect of the present invention, the stemming portion is constituted by a protrusion that protrudes from at least one of the sealing body and the inner wall surface of the housing, which face each other in the direction of the axis, toward the other of the sealing body and the inner wall surface of the housing.

That is, the stemming portion includes a protrusion that is provided in at least one of the sealing body, and the inner wall surface of the housing that faces the sealing body in the direction of the axis, and protrudes toward the other of the sealing body and the inner wall surface of the housing.

Thereby, the downward flow that flows along the low-pressure side of the thin sealing piece can be reliably blocked.

Moreover, in a shaft sealing device according to a third aspect of the present invention, the stemming portion may be a circular-arc member that is provided via a rib extending further toward the radially inward side from an end portion of the plate-shaped body on the radially inward side, and extends in the circumferential direction of the rotor.

Thereby, the downward flow that flows along the low-pressure side of the thin sealing piece can be reliably blocked.

Additionally, in a fourth aspect of the present invention, in the shaft sealing device according to any one aspect of the first to third aspects, a plurality of the communication paths are formed at intervals in the circumferential direction.

Thereby, the downward flow blocked by the stemming portion can be effectively guided to the low-pressure-side region.

Moreover, in a shaft sealing device according to a fifth aspect of the present invention, a groove portion that connects low-pressure-side openings in the plurality of communication paths to each other is formed in the inner wall surface of the housing.

In a case where the plurality of communication paths are provided, a region where a communication path is present and a region where no communication path is present are arranged alternately in the circumferential direction in the inner wall surface of the housing. Thereby, a flow based on the downward flow blocked by the stemming portion becomes non-uniform, and the downward flow cannot be smoothly introduced into the low-pressure-side region.

On the other hand, in a fifth aspect of the present invention, the groove portion that connects the plurality of communication paths is formed in the inner wall surface of the housing that faces the sealing body. Therefore, the shape of the inner wall surface becomes uniform in the circumferential direction, and it is possible to avoid a flow based on the downward flow from becoming non-uniform.

Additionally, a rotary machine according to a sixth aspect of the present invention is equipped with any one of the shaft sealing devices.

According to such a rotary machine, since the rotary machine is equipped with any one of the above shaft sealing devices, it is possible to prevent a disturbance of flow based on the downward flow from occurring at the tip of the thin sealing piece. Accordingly, the shaft sealing device has a long service life, and a rotary machine having excellent maintainability can be provided.

Effect of the Invention

According to the shaft sealing device and the rotary machine equipped therewith according to the present invention, by preventing the downward flow from flowing along the low-pressure side of the thin sealing piece reaches the tip of the thin sealing piece, it is possible to avoid an occurrence of a disturbance of a flow caused by the downward flow in the tip of the thin sealing piece. Since this can prevent fluttering from occurring in the thin sealing piece, it is possible to improve durability.

DESCRIPTION OF EMBODIMENTS

A first embodiment of the present invention will be described with reference to the drawings.

Figure 1:
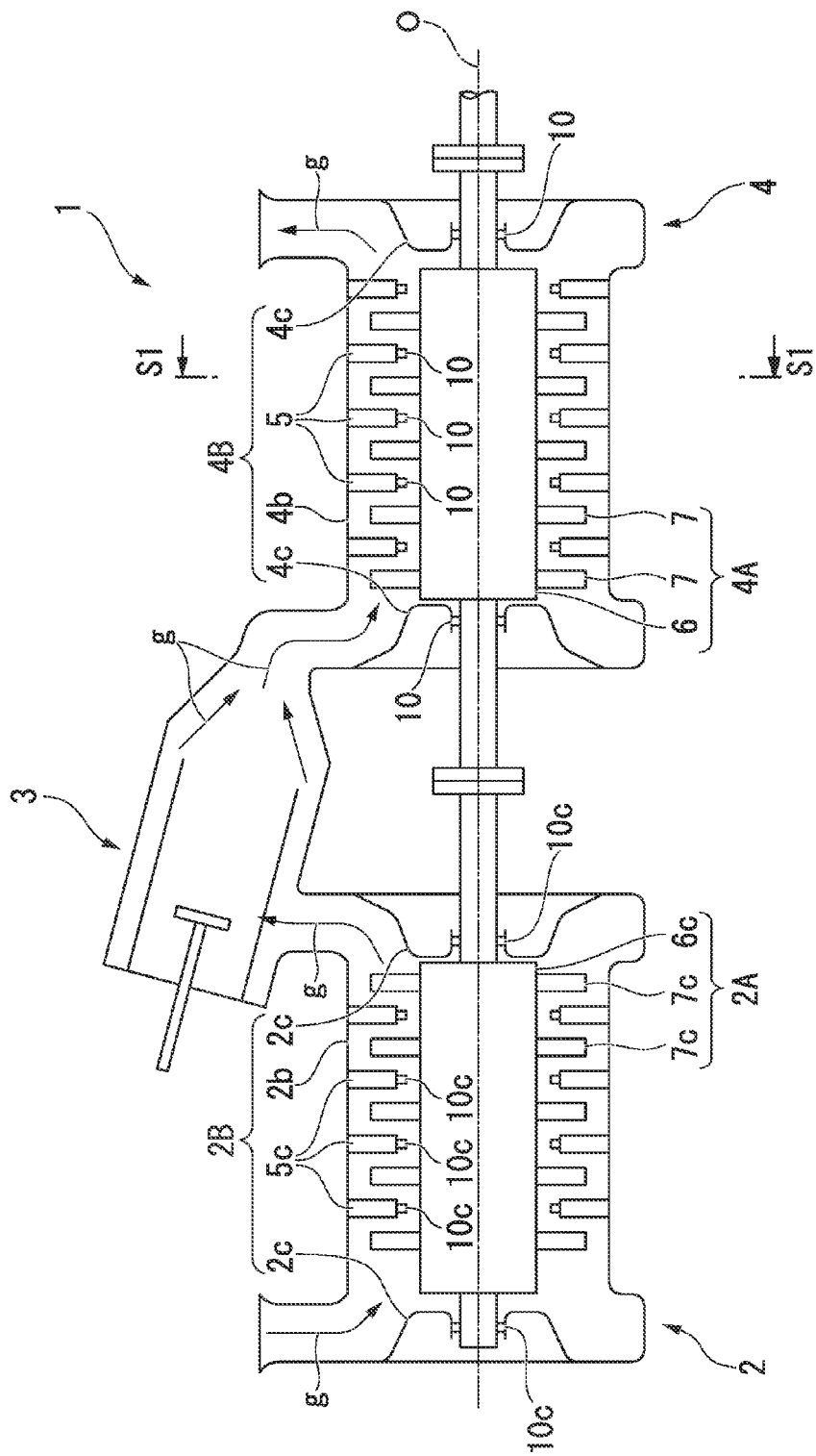
FIG. 1 is a schematic overall configuration view of a gas turbine (rotary machine) according to a first embodiment of the present invention.

FIG. 1 is a schematic overall configuration view of a gas turbine (rotary machine) 1 according to the first embodiment of the present invention.

The gas turbine 1, as shown in FIG. 1, includes a compressor (rotary machine) 2 that takes in and compresses a large amount of air thereinto, a combustor 3 that mixes fuel with the compressed air compressed in the compressor 2 and combusts the mixture, and a turbine (rotary machine) 4 that converts the heat energy of a combustion gas introduced from the combustor 3 into rotational energy.

The compressor 2 and the turbine 4 respectively include rotors 2A and 4A that are coupled together so as to integrally rotate, and stators 2B and 4B that surround the rotors 2A and 4A. In addition, in the following description, unless particularly mentioned, the direction of the axis O of the rotors 2A and 4A is simply referred to as "direction of the axis O", the circumferential direction of the rotors 2A and 4A is simply referred to as "circumferential direction", and the radial direction of the rotors 2A and 4A is simply referred to as "radial direction".

The rotor 2A, 4A have a rotating shaft 6c, 6 and a plurality of annular compressor blade and turbine blade groups 7c, 7 that are fixed at intervals in the direction of the axis O. Each annular compressor blade and turbine blade group 7c, 7 is configured to have a plurality of compressor blades and turbine blades that are fixed at intervals from each other in the circumferential direction, at the outer periphery of the rotating shaft 6c, 6.

Each stator 2B, 4B includes a casing 2b, 4b, and a plurality of annular compressor vane and turbine vane groups 5c, 5 that are fixed at intervals in the direction of the axis O within the casing 2b, 4b. The annular compressor vane and turbine vane group 5c, 5 is configured to have a plurality of compressor vanes and turbine vanes that are fixed at intervals from each other in the circumferential direction on the inner surface of each casing 2b, 4b. A hub shroud is formed at the tip of each compressor vane and turbine vane. The hub shrouds (stators) are coupled together in the circumferential direction, become annular as a whole, and surround the outer periphery of the rotating shaft 6c, 6.

The annular compressor vane and turbine vane groups 5c, 5 are arranged in the directions of the axis O alternately with the plurality of annular compressor blade and turbine blade groups 7c, 7.

In the compressor 2 and the gas turbine 4, in order to prevent a working fluid (compressed air or combustion gas) g from leaking out in the direction of the axis O from a high-pressure side to a low-pressure side, as shown in FIG. 1, a shaft sealing device 10c, 10 is provided at the hub shroud of each annular compressor blade and turbine vane group 5c, 5. Additionally, in order to prevent the working fluid g from leaking from the high-pressure side to the low-pressure side, shaft sealing devices 10c, 10 are provided even at bearings (stators) 2c, 4c where the casings 2b, 4b support the rotating shaft 6c, 6.

A first embodiment of the shaft sealing device 10 of the turbine 4 will be described below. In addition, although the shaft sealing device 10 of the turbine 4 will be described below, since the shaft sealing device 10c of the compressor 2 also has basically the same configuration, a description thereof is omitted here.

Figure 2:
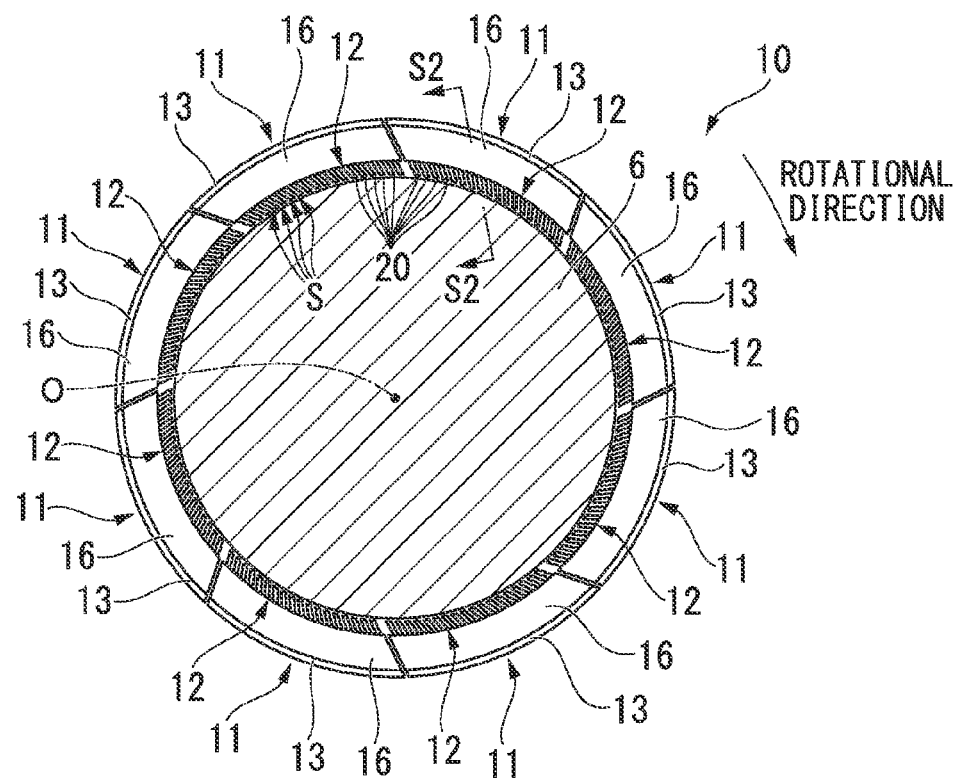
FIG. 2 is a cross-sectional view taken along line S1-S1 in FIG. 1.
Figure 3:
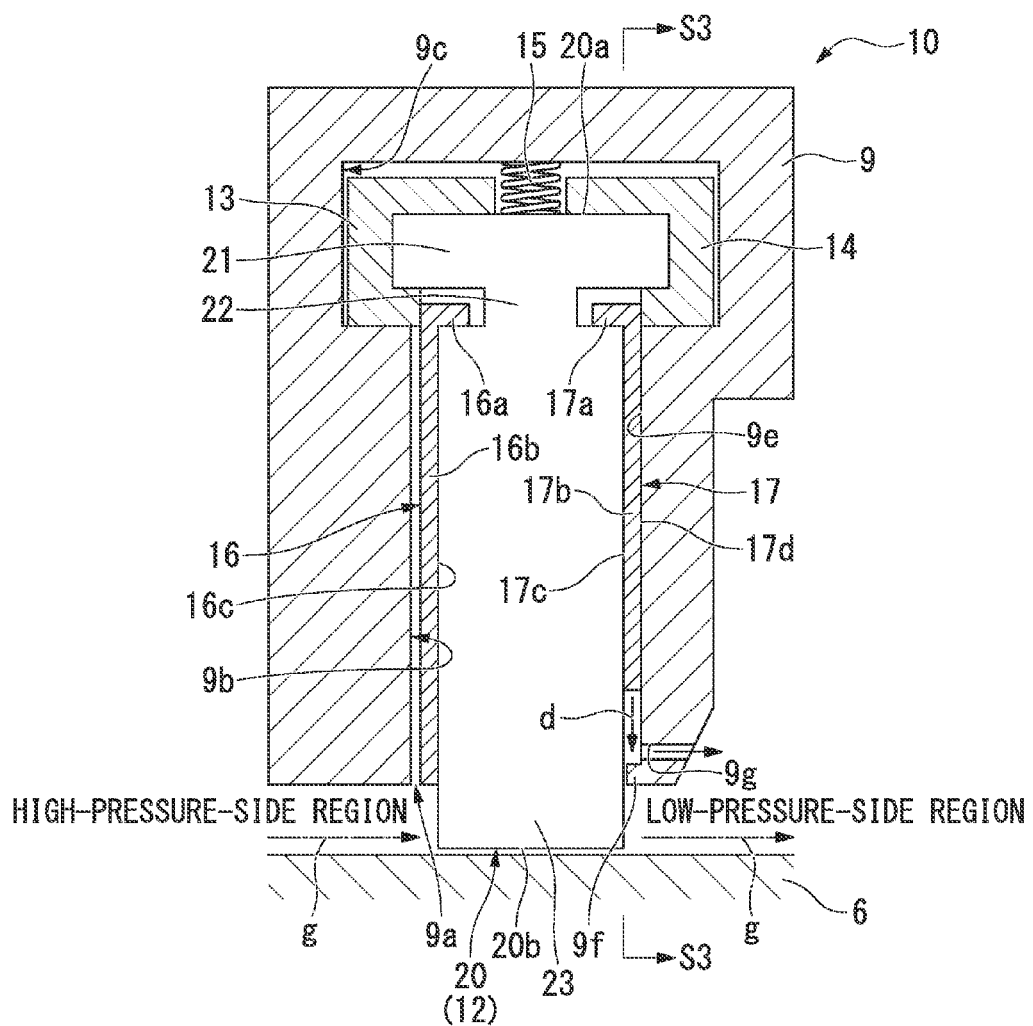
FIG. 3 is a cross-sectional view taken along line S2-S2 in FIG. 2.

FIG. 2 is a cross-sectional view taken along line S1-S1 in FIG. 1, and FIG. 3 is a cross-sectional view taken along line S2-S2 in FIG. 2.

The shaft sealing device 10 of the turbine 4 is configured by arranging a plurality of (eight in the first embodiment) sealing segments 11, which extend in a circular-arc shape, in the circumferential direction within an annular housing 9 supported by the hub shroud of the annular turbine vane group 5 and the inner peripheral surface of the bearing 4c, respectively.

The housing 9 extends over the whole circumference in the circumferential direction along the outer periphery of the rotating shaft 6, and an annular accommodation space 9a that is recessed toward the outside from the radially inward side is formed inside the housing. As shown in FIG. 3, the opening side of the accommodation space 9a of the housing 9, that is, the portion of the accommodation space on the radially inward side serves as an inside space 9b in which the width dimension (dimension in the direction of the axis O) is made small. Additionally, a space spaced apart radially outward from the opening of the accommodation space 9a, that is, a space located further to the radially outward side than the inside space 9b is an outside space 9c in which the width dimension is made large. The inside space 9b and the outside space 9c are in a mutually communicating state.

That is, the accommodation space 9a of the housing 9 includes the inside space 9b and the outside space 9c. The inside space 9b is formed on the radially inward side of the accommodation space 9a, and the outside space 9c is formed on the radially outward side of the accommodation space 9a. The width of the inside space 9b in the direction of the axis O is smaller than the width of the outside space 9c, and the inside space 9b communicates with the outside space 9c.

The sealing segment 11, as shown in FIG. 3, is constituted by a sealing body 12 (refer to FIG. 4) constituted by multiple thin sealing pieces 20, retaining rings 13 and 14 that are formed to have a U-shaped cross-section and retain the multiple thin sealing pieces 20, an elastic body 15 that biases the sealing body 12 toward the radially inward side, and a high-pressure-side side sealing plate 16 and a low-pressure-side side sealing plate 17 are provided so that the sealing body 12 is sandwiched therebetween from the direction of the axis O.

Figure 4:
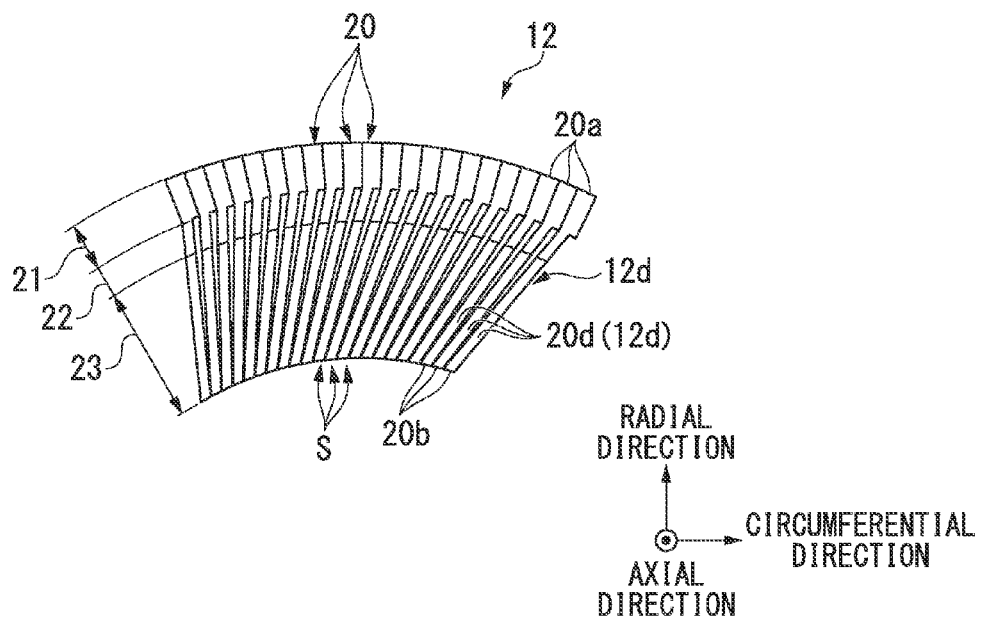
FIG. 4 is a schematic view when sealing segments are seen from the direction of the axis.

FIG. 4 is a schematic view when the sealing segments 11 are seen from the direction of the axis O.

In the sealing body 12, as shown in FIG. 4, the multiple thin sealing pieces 20 having a thin film shape are stacked (refer to FIG. 2), and the ends of the multiple thin sealing pieces 20 on the radially outward side, that is, the rear ends 20a of the thin sealing pieces 20, are coupled to each other.

The thin sealing piece 20, as shown in FIG. 3, is a member that is formed of mainly a thin steel sheet, is formed in a T-shape as seen from the circumferential direction of the rotating shaft 6, and is arranged so that the width direction is turned to the direction of the axis O of the rotating shaft 6. In other words, the thin sealing piece 20 is arranged so that the thickness direction thereof is turned to the circumferential direction of the rotating shaft 6.

The thin sealing piece 20 has a head 21, a body 23 that is formed so that the width dimension and thickness dimension thereof are smaller than those of the head 21, and a neck 22 that is located between the head 21 and the body 23 and is formed so that the width dimension thereof is smaller than the width dimension of the head and the body. The thin sealing piece 20 is formed so as to be continuous in order of the head 21, the neck 22, and the body 23 from the radially outward side of the rotating shaft 6 toward the radially inward side thereof.

The multiple thin sealing pieces 20 are mutually coupled by their respective heads 21 being welded to each other. Additionally, the bodies 23 of the multiple thin sealing pieces 20 are elastically deformable, and the end portions of the respective bodies 23 on the radially inward side, that is, the tips 20b of the thin sealing pieces 20 are free ends. The tips 20b of the respective thin sealing pieces 20 come into contact with the rotating shaft 6 at predetermined precompression at the stop of the rotating shaft 6.

The multiple thin sealing pieces 20, as shown in FIG. 4, are arranged with small clearances s therebetween in the circumferential direction. In the thin sealing pieces 20, the thickness dimension of the head 21 is set to be larger than the thickness dimension of the neck 22 and the body 23, whereby a small clearance s is formed between the bodies 23 of two thin sealing pieces 20 that are adjacent to each other in the thickness direction.

The retaining rings 13 and 14 are members that extend in the circumferential direction of the rotating shaft 6, and both are formed in a U-shape in a cross-section including the axis O. The width (dimension of a groove portion in the radial direction of the rotating shaft 6) of a groove portion of each retaining ring 13, 14 is slightly larger than the dimension of the head 21 of the thin sealing piece 20 in the radial direction. The portion of the head 21 of the thin sealing piece 20 on the high-pressure side is fitted into the groove portion of the retaining ring 13, and the portion of the head 21 of the thin sealing piece 20 on the low-pressure side is fitted into the groove portion of the retaining ring 14. Thereby, the heads 21 of the multiple thin sealing pieces 20 are retained by the retaining rings 13 and 14.

In both the high-pressure-side side sealing plate 16 and the low-pressure-side side sealing plate 17, the thickness direction is turned to the direction of the axis O and the shape as seen from the direction of the axis O of the rotating shaft 6 is formed in a circular-arc strip shape. Additionally, each of the high-pressure-side side sealing plate 16 and the low-pressure-side side sealing plate 17 has a base portion 16a, 17a that is an end portion on the radially outward side, and a sealing plate portion 16b, 17b that extends further toward the radially inward side than the base portion 16a, 17a. The base portion 16a, 17a has a thickness (the dimension in the direction of the axis O) that is larger than the thickness of the sealing plate portion 16b, 17b, and protrudes in the direction of the axis O with reference to the sealing plate portion 16b, 17b. Moreover, the radial dimension of the low-pressure-side side sealing plate 17 is set to be smaller than the radial dimension of the high-pressure-side side sealing plate 16.

The base portion 16a of the high-pressure-side side sealing plate 16 is pressed from the high-pressure side by the retaining ring 13 in a state where the base portion has entered a recess on the high-pressure side between the head 21 and the body 23 of the thin sealing piece 20.

Thereby, a plate surface 16c of the high-pressure-side side sealing plate 16 that faces the low-pressure side is fixed so as to cover the high-pressure side of the sealing body 12.

In addition, in the first embodiment, the end portion of the high-pressure-side side sealing plate 16 on the radially inward side, that is, the tip of the high-pressure-side side sealing plate 16 extends to the opening of the accommodation space 9a on the radially inward side. Thereby, the tip 20b of the thin sealing piece 20 that extends toward the radially inward side from the accommodation space 9a extends further toward the radially inward side than the tip of the high-pressure-side side sealing plate 16.

The base portion 17a of the low-pressure-side side sealing plate 17 is pressed from the low-pressure side by the retaining ring 14 in a state where the base portion has entered a recess on the low-pressure side between the head 21 and the body 23 of the thin sealing piece 20.

The base portion 17a is sandwiched between the neck 22 of the thin sealing piece 20 and the retaining ring 14.

Thereby, a plate surface 17c of the low-pressure-side side sealing plate 17 that faces the high-pressure side is fixed so as to cover the low-pressure side of the sealing body 12.

In addition, in the first embodiment, the end portion of the low-pressure-side side sealing plate 17 on the radially inward side, that is, the tip of the low-pressure-side side sealing plate 17 is located further toward the radially outward side than the opening of the accommodation space 9a on the radially inward side.

The sealing segment 11, as shown in FIG. 3, is accommodated in the accommodation space 9a of the housing 9 with a clearance.

More specifically, the retaining rings 13 and 14 that retain the head 21 of the thin sealing piece 20 are accommodated in the outside space 9c of the accommodation space 9a, and the high-pressure-side side sealing plate 16 and the low-pressure-side side sealing plate 17 and the body 23 of the thin sealing piece 20 are accommodated in the inside space 9b of the accommodation space 9a. The tip of the body 23, that is, the tip 20b of the thin sealing piece 20 protrudes toward the rotating shaft 6 from the opening of the accommodation space 9a.

The radial displacement of the sealing segment 11 is restricted as the retaining rings 13 and 14 interfere with the inner wall surface of the outside space 9c of the housing 9, and the displacement thereof in the direction of the axis O is restricted within a predetermined range as the high-pressure-side side sealing plate 16 and the low-pressure-side side sealing plate 17 interfere with the inner wall surface of the inside space 9b of the housing 9. In addition, the sealing segment 11 is biased to the radially inward side by the elastic body 15 provided in the outside space 9c.

When the gas turbine 1 is operated, the above-described sealing segment 11 is displaced to the low-pressure side by the pressure of the combustion gas g, and as shown in FIG. 3, the plate surface 17d of the low-pressure-side side sealing plate 17 is pressed against an inner wall surface 9e of the housing 9 (the inside space 9b) facing the direction of the axis O.

Here, in the first embodiment, a protrusion 9f (stemming portion) that protrudes in the direction of the axis O toward the sealing body 12 is formed at the end portion of the inner wall surface 9e on the radially inward side, which faces the low-pressure side, in the accommodation space 9a of the housing 9, that is, at the tip of the inner wall surface 9e. That is, the protrusion 9f that protrudes toward the sealing body 12 further on the radially inward side than the tip of the low-pressure-side side sealing plate 17 is formed on the above inner wall surface 9e.

In addition, the protruding height of the protrusion 9f from the inner wall surface 9e is set so that a slight clearance is formed between the protrusion and the low-pressure side of the sealing body 12 when the sealing segment 11 is displaced to the low-pressure side by the pressure of the combustion gas g.

Figure 5:
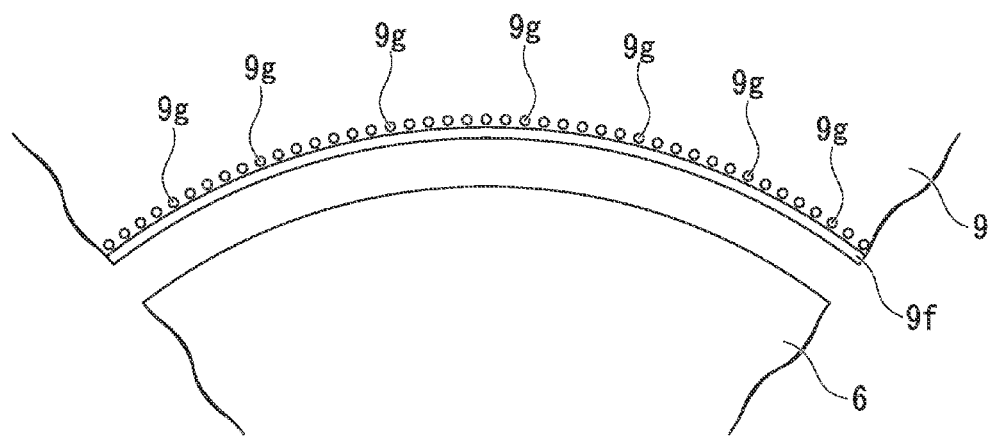
FIG. 5 is a cross-sectional view taken along line S3-S3 in FIG. 3.

FIG. 5 is a cross-sectional view taken along line S3-S3 in FIG. 3.

A communication path 9g opens to the portion of the inner wall surface 9e of the housing 9 that is located further toward the radially outward side than the protrusion 9f and is located further toward the radially inward side than the tip of the low-pressure-side side sealing plate 17. The communication path 9g opens to the inner wall surface 9e at an opening of one end thereof, and opens to the low-pressure-side region at the other end thereof. The communication path 9g is formed in the housing 9 so as to extend in the direction of the axis O, and a cross-sectional shape orthogonal to the extending direction of the communication path 9g is formed in a substantially circular shape. A plurality of such communication paths 9g, as shown in FIG. 5, are formed at intervals in the circumferential direction.

Next, the operation of the above-described shaft sealing device 10 will be described.

If the gas turbine 1 is started from a stopped state, the pressure differential between the low-pressure-side region and a high-pressure-side region becomes large, and the sealing segment 11 is pressed against the combustion gas g toward the low-pressure-side region in proportion to this. In this case, the combustion gas g that flows from the high-pressure-side region to the low-pressure-side region passes through the small clearances s of the thin sealing pieces 20 of the sealing body 12.

Then, if the pressure differential between the low-pressure-side region and the high-pressure-side region becomes equal to or larger than a predetermined value, the plate surface 17d of the low-pressure-side side sealing plate 17 that faces the low-pressure side comes into close contact with the inner wall surface 9e as the combustion gas g presses the sealing body 12 and the low-pressure-side side sealing plate 17 as a whole.

Figure 6:
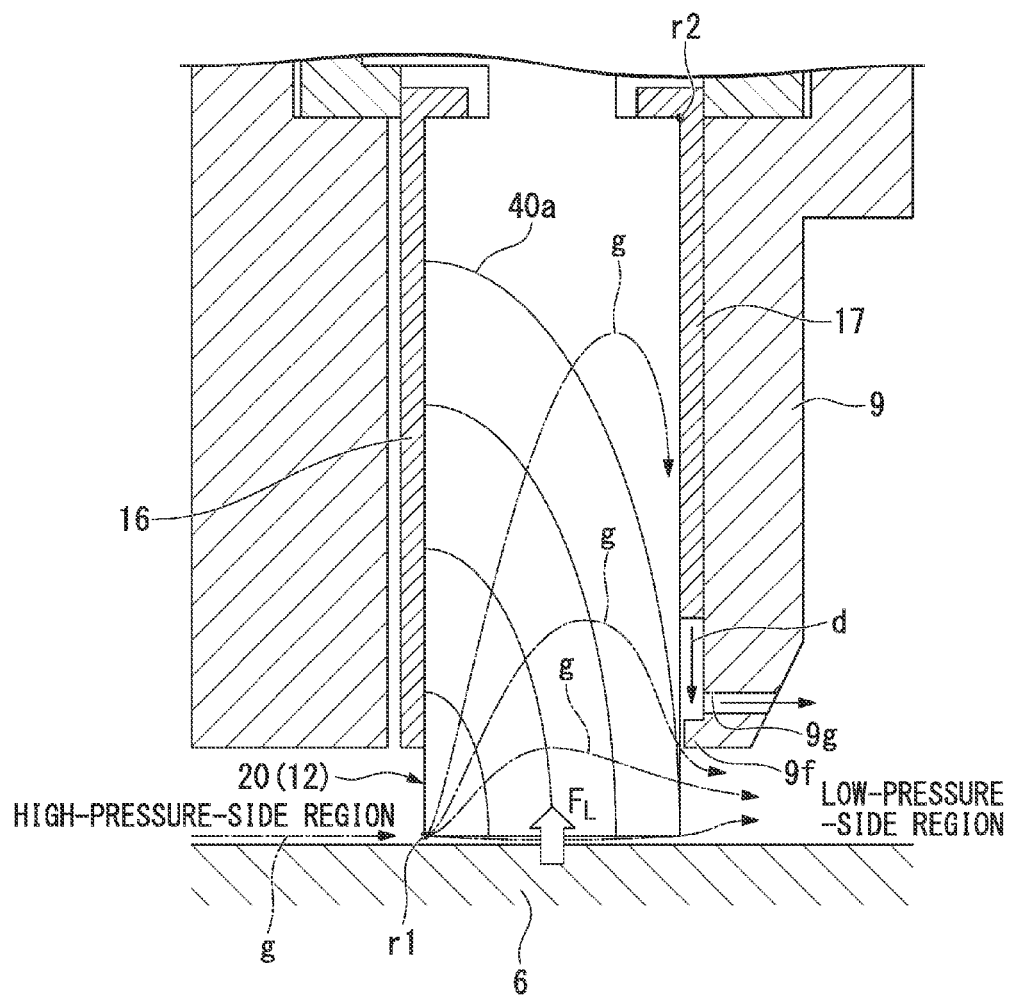
FIG. 6 is a gas pressure distribution map of a working fluid formed in a small clearance of a sealing segment according to the first embodiment of the present invention.
Figure 7:
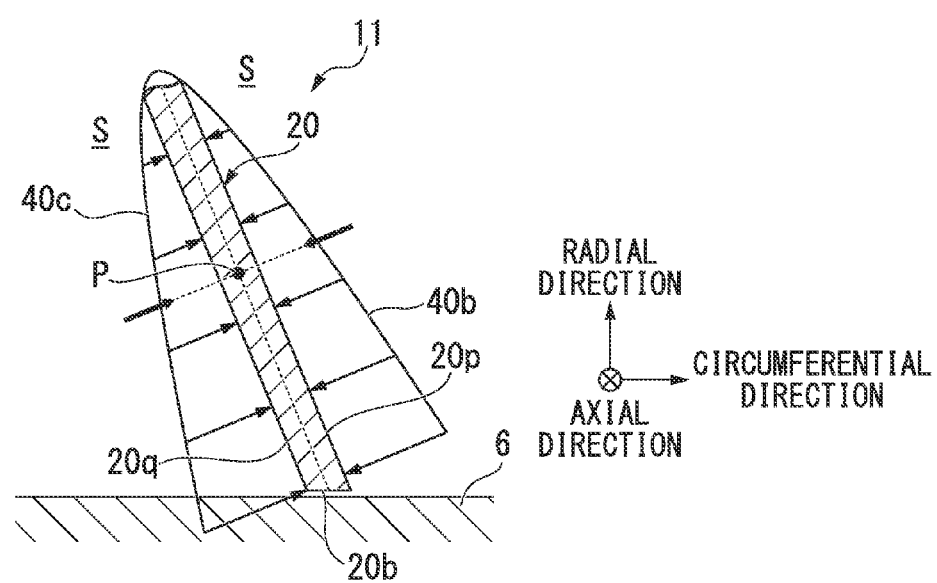
FIG. 7 is a cross-sectional view of main portions of a thin sealing piece in the sealing segment according to the first embodiment of the present invention, and a view of a cutting plane of a body intersecting the direction of the axis of a rotating shaft and showing the pressure applied to the body by vectors.

On the other hand, the combustion gas g that has entered each small clearance s, as shown in FIGS. 6 and 7, flows radially in the direction of an angled portion r2 from an angled portion r1 along a top face 20p and a bottom face 20q that face each other in the circumferential direction via the small clearance s.

That is, the radial dimension of the low-pressure-side side sealing plate 17 is set to be smaller than the radial dimension of the high-pressure-side side sealing plate 16. As a result, as shown in FIG. 6, a gas pressure distribution 40a is formed in which gas pressure is the highest at the angled portion r1 located on the high-pressure side at the tip 20b of the thin sealing piece 20 and gas pressure becomes gradually weaker toward the diagonal angled portion r2.

As shown in FIG. 6, in the gas pressure distribution 40a, a low-pressure region is enlarged toward the rear end 20a of the thin sealing piece 20. Therefore, as shown in FIG. 7, gas pressure distributions 40b and 40c applied to the top face 20p and the bottom face 20q of each thin sealing piece 20 have triangular distribution shapes in which gas pressure become larger as it gets closer to the tip 20b of the thin sealing pieces 20 and becomes smaller as it goes toward the rear end 20a.

As shown in FIG. 7, although the gas pressure distributions 40b and 40c in the respective top face 20p and bottom face 20q have substantially the same shape, each thin sealing piece 20 is arranged so as to incline in the tangential direction of the outer peripheral surface of the rotating shaft 6, and therefore the relative positions of the respective gas pressure distributions 40b and 40c in the top faces 20p and the bottom face 20q shifts. Hence, a difference is caused between the gas pressures of the top face 20p and the bottom face 20q at an arbitrary point P between the rear end 20a of the thin sealing piece 20 and the tip 20b thereof, and a gas pressure applied to the bottom face 20q becomes higher than a gas pressure applied to the top face 20p. Thereby, a lifting force $F_L$ (refer to FIG. 6) is generated in the tip 20b of the thin sealing piece 20 in the direction in which the tip is lifted from the rotating shaft 6.

The lifting force $F_L$ is applied to the thin sealing piece 20 as described above, and assists a lifting force by a dynamic-pressure effect.

Here, the combustion gas g that flows from the angled portion r1 to the angled portion r2 located at the diagonal of the angled portion r1 based on the gas pressure distribution 40a shown in FIG. 6 whirls gradually toward the radially inward side, and finally escapes to the low-pressure side of the thin sealing piece 20. In this way, the combustion gas g that has escaped from the thin sealing piece 20 to the low-pressure side flows as a flow that is directed to the radially inward side along the low-pressure side of the thin sealing piece 20, that is, a downward flow.

As a result of the fact that such a downward flow d flows toward the radially inward side, the downward flow reaches the tip of the thin sealing piece 20. In this case, if a clearance is created between the tip 20b of the thin sealing piece 20 and the outer peripheral surface of the rotating shaft 6, disturbance of a flow causes fluttering of the tip 20b of the thin sealing piece.

In contrast, in the first embodiment, since the protrusion 9f is formed at the end portion of the inner wall surface 9e of the housing 9 on the radially inward side, the downward flow d is blocked by the protrusion 9f. That is, the protrusion 9f serves as a stemming portion that blocks the downward flow d.

Then, the flow of a fluid based on the downward flow d blocked in this way is guided to the low-pressure-side region via the communication path 9g formed in the housing 9. It is thereby possible to prevent the downward flow d from reaching the tip of the thin sealing piece.

Accordingly, even in a case where an unexpected clearance is formed between the tip 20b of the thin sealing piece 20 and the outer peripheral surface of the rotating shaft 6, disturbance of a flow based on the downward flow d can be prevented from occurring at the tip 20b of the thin sealing piece 20. Since this can prevent fluttering from occurring in the thin sealing piece 20, it is possible to improve durability.

Additionally, according to the gas turbine 1 including such a shaft sealing device 10, since the shaft sealing device 10 has long service life, it is possible to improve maintainability.

Figure 8:
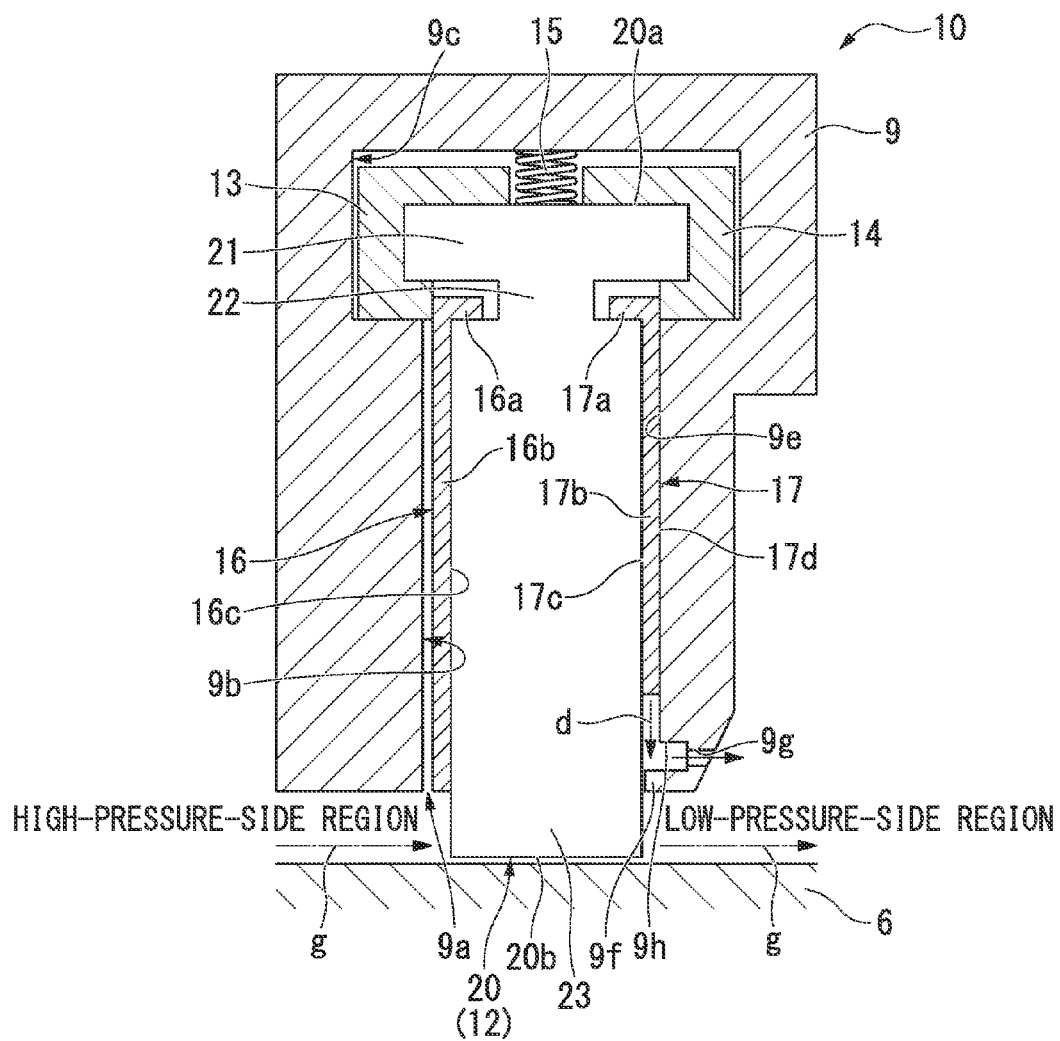
FIG. 8 is a view illustrating an example in which a groove portion connecting openings of a plurality of communication paths is formed in an inner wall surface of a housing.

In addition, as a modified example of the first embodiment, for example, as shown in FIG. 8, a groove portion 9h may be formed in the inner wall surface 9e in the accommodation space 9a of the housing 9. That is, the groove portion 9h, which is an annular groove that is recessed in an annular shape centered on the axis O, connects the low-pressure-side openings of the plurality of communication paths 9g, which are formed at intervals in the circumferential direction, to each other.

Here, in a case where the plurality of communication paths 9g are provided, a region where a communication path 9g is present and a region where no communication path 9g is present are arranged alternately in the circumferential direction in the inner wall surface 9e of the housing 9. Thereby, since the inner wall surface 9e is formed in a non-uniform shape in the circumferential direction, a flow based on the downward flow d blocked by the protrusion 9f becomes non-uniform, and the downward flow d cannot be smoothly introduced into the low-pressure-side region.

In contrast, in the modified example of the first embodiment, the groove portion 9h that connects the high-pressure-side openings of the plurality of communication paths 9g is formed. Therefore, the shape of the inner wall surface 9e can be made uniform in the circumferential direction. It is thereby possible to prevent the downward flow d from being disturbed by the inner wall surface 9e. Therefore, it is possible to prevent a flow based on the downward flow d from becoming non-uniform and to smoothly introduce the flow into the low-pressure-side region.

Figure 9:
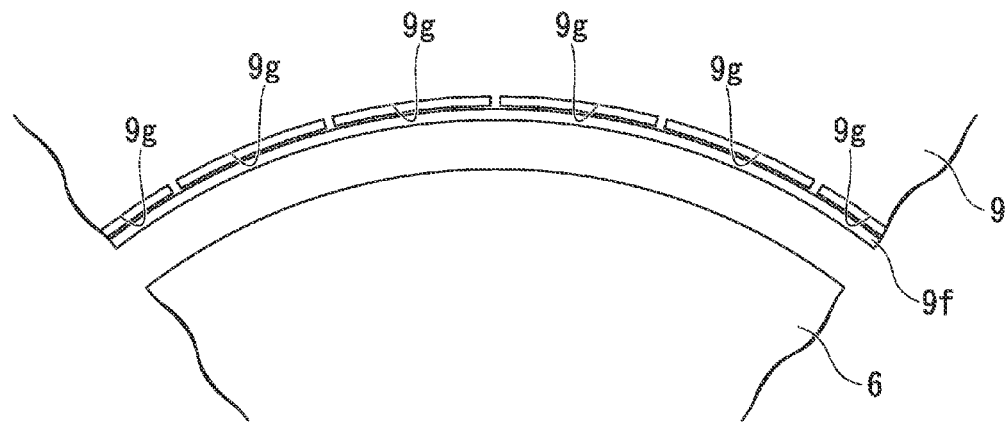
FIG. 9 is a view illustrating an example in which the communication paths are formed in the shape of a slit.

Additionally, in the first embodiment, the cross-sectional shape of the communication path 9g orthogonal to the axis O is a circular shape. However, the present invention is not limited to this. For example, as shown in FIG. 9, the cross-sectional shape may be formed in the shape of a slit that extends in the circumferential direction. That is, the cross-sectional shape of the communication path 9g orthogonal to the axis O extends in an elongated shape so as to cover a predetermined range in the circumferential direction.

In this case, compared to a case where the cross-sectional shape of the communication path 9g is a circular shape, the shape of the inner wall surface 9e can be made uniform in the circumferential direction. It is thereby possible to prevent the downward flow d from being disturbed by the inner wall surface 9e, similar to the modified example of the first above embodiment, and it is possible to prevent a flow based on the downward flow d from becoming non-uniform and to smoothly introduce the flow into the low-pressure-side region.

In addition, in a case where the communication path 9g is formed in the shape of a slit and the groove portion 9h is formed, a flow based on the downward flow d can be more smoothly guided to the low-pressure-side region by the synergistic effect of both structures.

Figure 10:
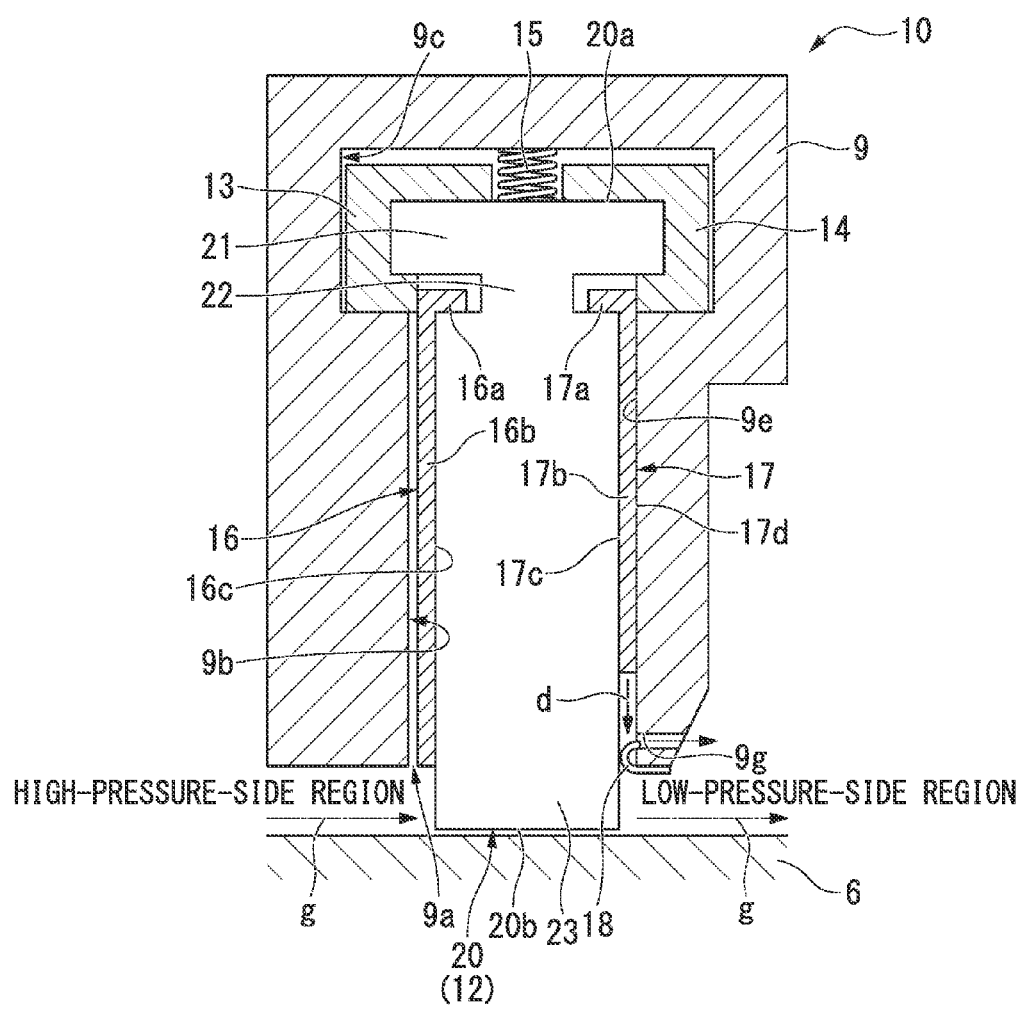
FIG. 10 is a view illustrating an example in which a protrusion is provided as a separate member.

Moreover, for example, as shown in FIG. 10, a member that is separate from the housing 9 may constitute the protrusion 18. That is, the protrusion 18 as the separate member is configured so as to be mountable on the tip of the inner wall surface 9e in the accommodation space 9a of the housing 9, and for example, as shown in FIG. 10, is fixed to the housing 9 by inserting a portion of the protrusion 18 through the low-pressure side opening of the communication path 9g.

In a case where the protrusion 18 is constituted by the separate member, it is not necessary to separately perform processing for forming the protrusion 18 on the inner wall surface 9e of the housing 9. Accordingly, the processing process of the inner wall surface 9e of the housing 9 can be further simplified.

In addition, the protrusion 18 as the separate member may be formed from the same material as the housing 9 and may be formed from a different material. Additionally, as the material of the protrusion 18, it is preferable to form the protrusion from a metal with a low coefficient of linear expansion.

Moreover, the protrusion 18 may be fixed to the housing 9 by, for example, welding, screwing, or the like.

Figure 11:
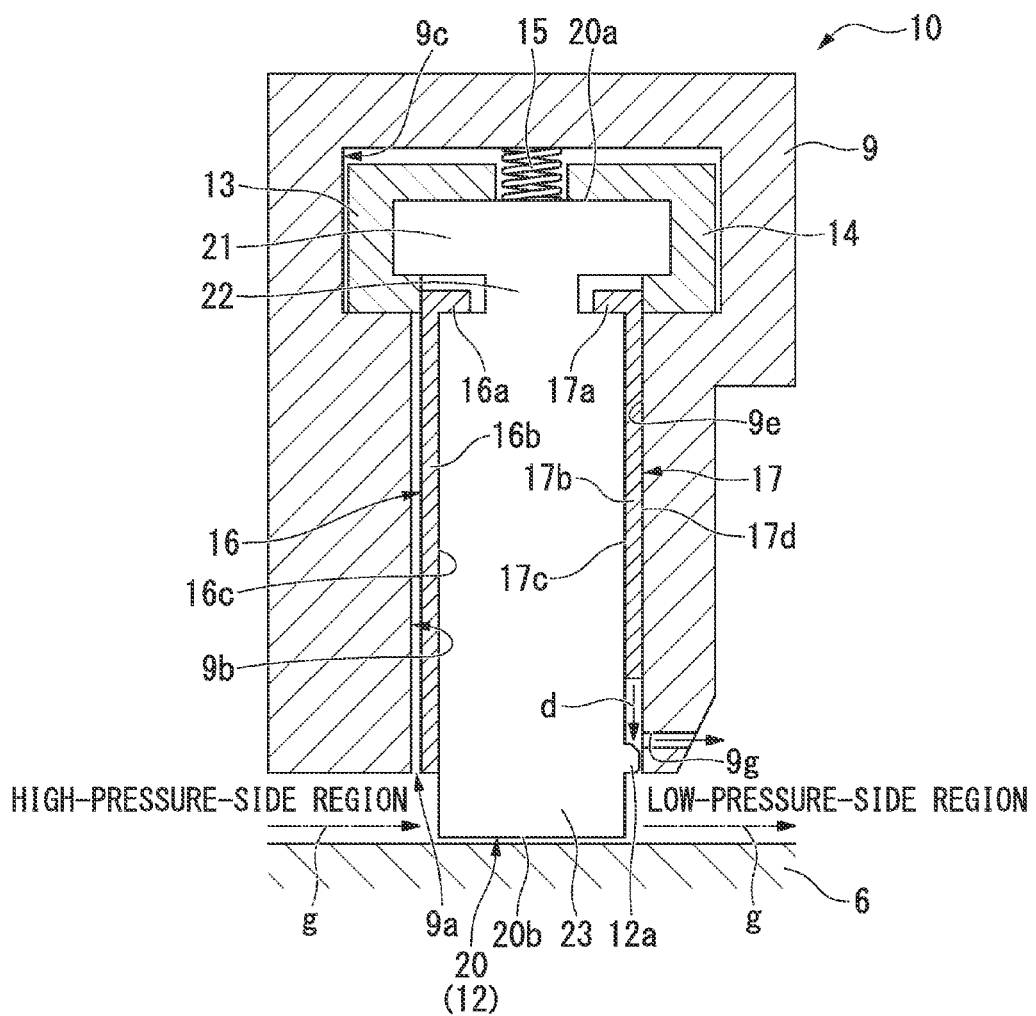
FIG. 11 is a view illustrating an example in which the protrusion is provided on a sealing body.

Additionally, although the protrusion 9f is provided in the inner wall surface 9e of the housing 9 in the first embodiment, for example, as shown in FIG. 11, a protrusion 12a may be formed on the sealing body 12. That is, a configuration in which the protrusion 12a that protrudes toward the low-pressure side, that is, toward the inner wall surface 9e of the housing 9 is integrally formed the low-pressure-side end portion of each thin sealing piece 20 that constitutes the sealing body 12.

Even in this case, the same working effects as the first embodiment can be obtained as the protrusion 12a of the sealing body 12 serves as a stemming portion that blocks the downward flow d.

Additionally, since the processing of forming the protrusion 12a on the thin sealing piece 20 that constitutes the sealing body 12 may be performed without performing large-scale processing on the housing 9 itself, the stemming portion that blocks the downward flow d can be more easily provided.

Figure 12:
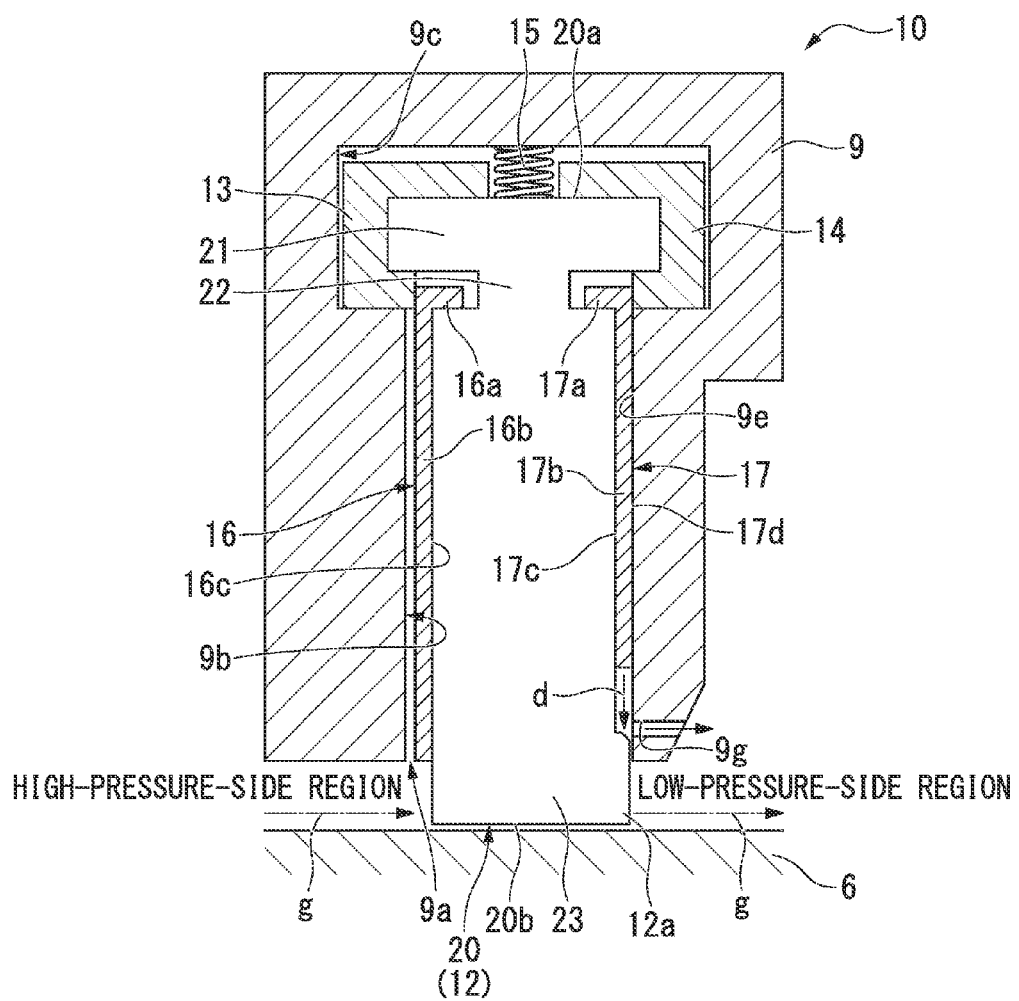
FIG. 12 is a view illustrating an example in which the protrusion is provided on a sealing body.

In addition, the protrusion 12a formed in the sealing body 12 in this may have not only a configuration in which a portion of the protrusion in the radial direction is made to protrude to the inner wall surface 9e side of the housing 9 as shown in FIG. 11, but also a configuration in which the protrusion is made to protrude over the whole region ranging from a location that faces the tip of the inner wall surface 9e of the housing 9 to the radially inward side, for example, as shown in FIG. 12. Even by this, the downward flow d can be reliably blocked.

Figure 13:
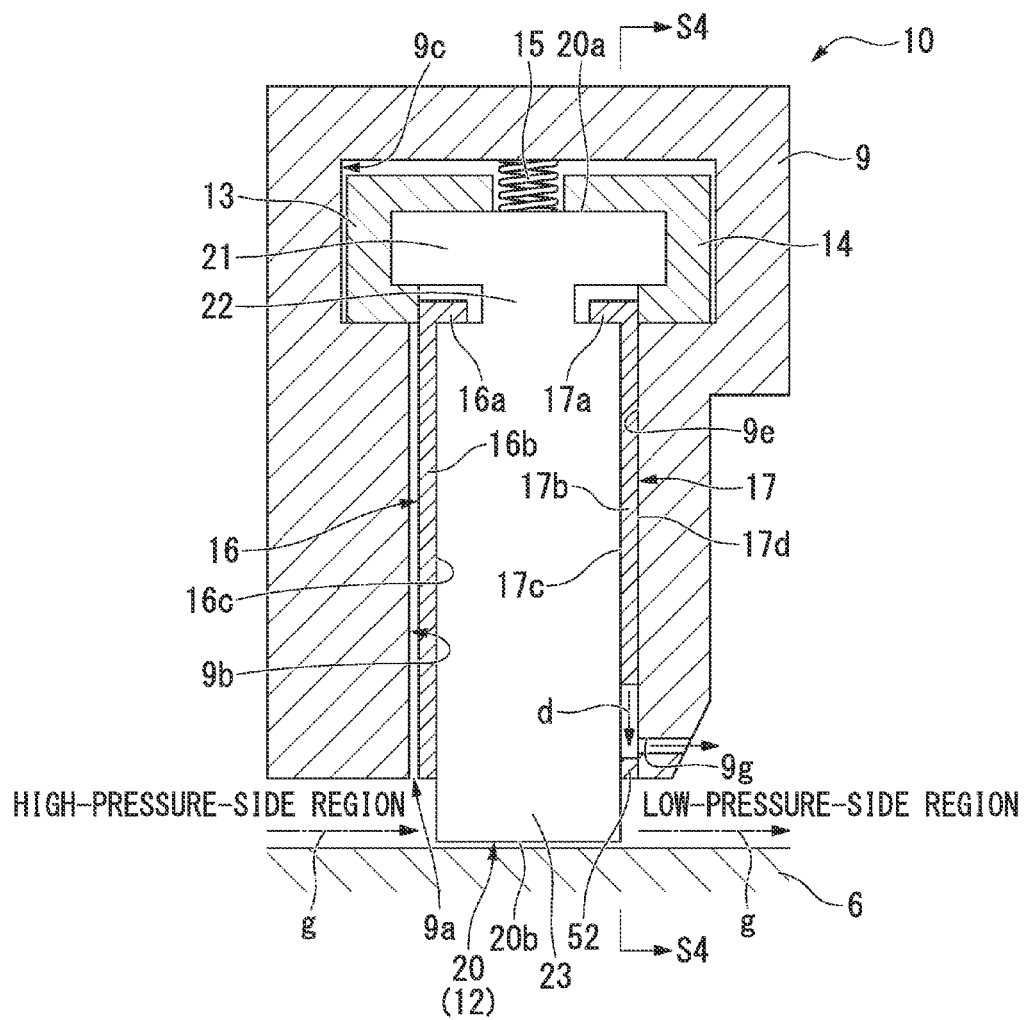
FIG. 13 is a longitudinal sectional view of a shaft sealing device of a second embodiment.
Figure 14:
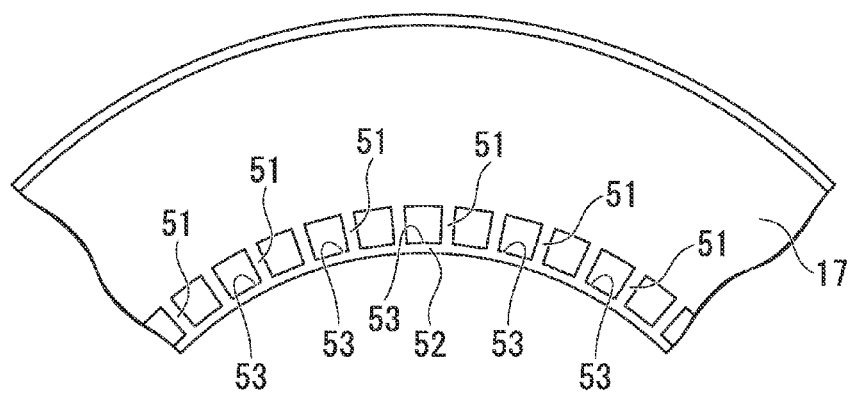
FIG. 14 is a cross-sectional view taken along line S4-S4 of FIG. 13.

Next, a shaft sealing device of a second embodiment of the present invention will be described with reference to FIGS. 13 and 14. In FIGS. 13 and 14, the same constituent elements as those of the first embodiment are designated by the same reference numerals, and a detailed description thereof is omitted here.

In the first embodiment, the stemming portion that blocks the downward flow d is constituted by the protrusion 9f provided on the housing 9. On the other hand, in the second embodiment, the stemming portion is constituted by a circular-arc member 52 provided via ribs 51 in the low-pressure-side side sealing plate 17.

That is, a plurality of ribs 51 that further extend toward the radially inward side from the tip of the low-pressure-side side sealing plate 17 of the second embodiment are provided at intervals in the circumferential direction at the tip of the low-pressure-side side sealing plate, that is, the end portion thereof on the radially inward side. The ribs 51 are formed integrally with the low-pressure-side side sealing plate 17, and the thickness of each rib 51 in the direction of the axis O is made to be equal to the thickness of the low-pressure-side side sealing plate 17 in the direction of the axis O or smaller than the thickness of the low-pressure-side side sealing plate 17 in the direction of the axis O. Additionally, all the radial dimensions of the plurality of ribs 51 are the same.

The circular-arc member 52 that extends in the circumferential direction so as to couple the tips of the plurality of ribs 51 to each other is integrally provided at the tips of the ribs 51, that is, the end portions thereof on the radially inward side. The circular-arc member 52 is formed in the shape of a circular arc centered on the axis O, and the thickness thereof in the direction of the axis O is made to be smaller than the thickness of the low-pressure-side side sealing plate 17 in the direction of the axis O. For example, it is preferable to set the thickness of the circular-arc member 52 in the direction of the axis O to a dimension that is smaller than the thickness of the low-pressure-side side sealing plate 17 in the direction of the axis O by about ten percent. In addition, in the second embodiment, the end portion of the circular-arc member 52 on the radially inward side and the end portion of the accommodation space 9a of the housing 9 on the radially inward side are arranged at substantially the same radial position.

By forming the ribs 51 and the circular-arc member 52 at the tip of the low-pressure-side side sealing plate 17 in this way, relief portions 53 that are spaces surrounded by the tip of the circular-arc member 52, the ribs 51, and the low-pressure-side side sealing plate 17 are defined. Such relief portions 53, as shown in FIG. 14, are arranged at intervals in the circumferential direction via the ribs 51.

In addition, the radial position of the low-pressure-side opening of the communication path 9g formed in the housing 9 is arranged between the tip of the low-pressure-side side sealing plate 17 and the circular-arc member 52, and thereby, the communication path 9g allows the relief portion 53 and the low-pressure-side region to communicate with each other.

Additionally, the low-pressure-side side sealing plate 17, the ribs 51, and the circular-arc member 52 can be easily molded, for example, by performing etching on one plate material.

In the shaft sealing device 10 of the second embodiment of the above configuration, the circular-arc member 52 provided at the tip of the low-pressure-side side sealing plate 17 via the ribs 51 functions as a stemming portion of the downward flow d. That is, the downward flow d that flows along the low-pressure side of the sealing body 12 is blocked by the circular-arc member 52, and a flow based on the downward flow is introduced into the low-pressure-side region via the communication path 9g.

Accordingly, similar to the first embodiment, a situation in which the downward flow d reaches the tip of the thin sealing piece 20 can be avoided, and even in a case where an unexpected clearance is formed between the tip 20b of the thin sealing piece 20 and the outer peripheral surface of the rotating shaft 6, a disturbance of a flow caused by the downward flow d can be prevented from occurring at the tip 20b of the thin sealing piece 20. Accordingly, since fluttering can be prevented from occurring in the thin sealing piece 20, it is possible to improve durability.

In addition, even in the second embodiment, the groove portion 9h that connects the low-pressure-side openings of the communication paths 9g may be formed in the inner wall surface 9e in the accommodation space 9a of the housing 9, similar to the first embodiment.

Additionally, the cross-sectional shape of the communication path orthogonal to the axis O may be formed in the shape of a slit.

Moreover, in the second embodiment, an example in which the ribs 51 and the circular-arc member 52 are integrally provided in the low-pressure-side side sealing plate 17, respectively, has been described. However, a configuration in which the ribs and the circular-arc member 52 are mounted on the low-pressure-side side sealing plate 17 as separate members may be adopted.

Although the embodiments of the invention have been described in detail, the invention is not limited to this unless departing from the technical idea of the invention, and some design changes or the like can also be made.

For example, in the above-described embodiments, the housing 9 is a member that is separate from the stator (the hub shrouds and the bearings 2c and 4c). However, the housing may be integrally formed.

Additionally, although an example in which the communication path 9g extends parallel to the axis O has been described in the embodiments, the communication path 9g may extend obliquely with respect to the axis O. Additionally, not only a configuration in which the communication path 9g extends linearly, but also a configuration in which the communication path extends in a bent manner may be adopted. That is, other configurations may be adopted if one end of the communication path 9g opens to the inner wall surface 9e of the housing 9 and the other end opens toward the low-pressure-side region.

INDUSTRIAL APPLICABILITY

The present invention provides a shaft sealing device provided in an annular space between a rotor and a stator surrounding an outer peripheral side of the rotor to divide the annular space into a low-pressure-side region and a high-pressure-side region in the direction of an axis of the rotor, the shaft sealing device including a housing fixed to the stator; a sealing body configured by stacking a plurality of thin sealing pieces extending toward a radially inward side of the rotor from the housing in a circumferential direction of the rotor; and a plate-shaped body that is arranged along the low-pressure side of the sealing body and in which a surface facing a low-pressure side is pressed against an inner wall surface of the housing facing the direction of the axis by means of the fluid pressure of a fluid applied from a high-pressure side to the low-pressure side. A stemming portion that blocks a flow of the fluid that is directed to the radially inward side along the low-pressure side of the sealing body is formed on the radially inward side of the plate-shaped body. The housing is formed with a communication path that guides the flow of the fluid blocked by the stemming portion to the low-pressure-side region, and a rotary machine equipped with the shaft sealing device. This can provide a shaft sealing device that can suppress fluttering of the thin sealing piece to improve durability, and a rotary machine equipped with the shaft sealing device.

REFERENCE SIGNS LIST

1: GAS TURBINE
2: COMPRESSOR
2A: ROTOR
2B: STATOR
3: COMBUSTOR
4: TURBINE
4A: ROTOR
4B: STATOR
5: ANNULAR TURBINE VANE GROUP
5c: ANNULAR COMPRESSOR VANE GROUP
6: ROTATING SHAFT
6c: ROTATING SHAFT
7: ANNULAR TURBINE BLADE GROUP
7c: ANNULAR COMPRESSOR BLADE GROUP
9: HOUSING
9a: ACCOMMODATION SPACE
9b: INSIDE SPACE
9c: OUTSIDE SPACE
9e: INNER WALL SURFACE
9f: PROTRUSION (STEMMING PORTION)
9g: COMMUNICATION PATH
9h: GROOVE PORTION
10: SHAFT SEALING DEVICE
10c: SHAFT SEALING DEVICE,
11: SEALING SEGMENT
12: SEALING BODY
12a: PROTRUSION (STEMMING PORTION)
13: RETAINING RING
14: RETAINING RING
15: ELASTIC BODY
16: HIGH-PRESSURE-SIDE SIDE SEALING PLATE
16a: BASE PORTION
16b: SEALING PLATE PORTION
16c: PLATE SURFACE
17: LOW-PRESSURE-SIDE SIDE SEALING PLATE
17a: BASE PORTION,
17b: SEALING PLATE PORTION
17c: PLATE SURFACE
17d: PLATE SURFACE
18: PROTRUSION (STEMMING PORTION)
20: THIN SEALING PIECE
20a: REAR END
20b: TIP
20p: TOP FACE
20q: BOTTOM FACE
21: HEAD
22: NECK
23: BODY
40a: GAS PRESSURE DISTRIBUTION
40b: GAS PRESSURE DISTRIBUTION
40c: GAS PRESSURE DISTRIBUTION
51: RIB
52: CIRCULAR-ARC MEMBER
53: RELIEF PORTION
r1: ANGLED PORTION
r2: ANGLED PORTION
g: COMBUSTION GAS
d: DOWNWARD FLOW
O: AXIS

The invention claimed is:

1. A shaft sealing device to be provided in an annular space between a rotor and a stator surrounding an outer peripheral side of the rotor to divide the annular space into a low-pressure-side region and a high-pressure-side region in a direction of an axis of the rotor, the shaft sealing device comprising:
   a housing to be fixed to the stator;
   a sealing body including a plurality of thin sealing pieces stacked so as to extend toward a radially inward side of the rotor from the housing in a circumferential direction of the rotor; and
   a high-pressure-side plate-shaped body and a low-pressure-side plate-shaped body positioned such that the sealing body is sandwiched between the high-pressure-side plate-shaped body and the low-pressure-side plate-shaped body from the direction of the axis of the rotor, wherein:
   the low-pressure-side plate-shaped body is arranged along a low-pressure side of the sealing body and in which a surface facing the low-pressure side is pressed against an inner wall surface of the housing facing the direction of the axis by pressure of a fluid applied in operation from a high-pressure side to the low-pressure side,
   a stemming portion adapted to block a flow of the fluid that is directed to the radially inward side along the low-pressure side of the sealing body is positioned adjacent the radially inward side of the low-pressure-side plate-shaped body,
   the housing includes a communication path for guiding the flow of the fluid blocked by the stemming portion to the low-pressure-side region, wherein the communication path opens to the inner wall surface of the housing at an opening of one end thereof and opens to the low-pressure-side region at another end thereof, the communication path being located farther toward a radially outward side than the stemming portion,
   the stemming portion is on a tip of the inner wall surface of the housing, and
   the stemming portion is fixed to the housing such that a part of the stemming portion extends through the opening of the communication path.

2. The shaft sealing device according to claim 1, wherein the stemming portion includes a protrusion that protrudes toward the sealing body.

3. A rotary machine comprising:
   the shaft sealing device according to claim 2.

4. The shaft sealing device according to claim 1, wherein the communication path is one of a plurality of communication paths defined at intervals in the circumferential direction.

5. The shaft sealing device according to claim 4, wherein a groove portion that connects low-pressure-side openings in the plurality of communication paths to each other is defined in the inner wall surface of the housing.

6. A rotary machine comprising:
   the shaft sealing device according to claim 5.

7. A rotary machine comprising:
   the shaft sealing device according to claim 4.

8. A rotary machine comprising:
   the shaft sealing device according to claim 1.

9. The shaft sealing device according to claim 1, wherein a radial dimension of the low-pressure-side plate-shaped body is smaller than a radial dimension of the high-pressure-side plate-shaped body.

10. The shaft sealing device according to claim 1, wherein the stemming portion is J-shaped.

11. The shaft sealing device according to claim 1, wherein the stemming portion includes an arcuate section.

12. The shaft sealing device according to claim 11, wherein
   the part of the stemming portion that extends through the opening of the communication path is a first section of the stemming portion,
   the arcuate section is a second section of the stemming portion,
   the stemming portion includes a third section parallel to the first section, and
   the arcuate section joins the first section to the third section.

* * * * *